United States Patent
Kim et al.

(10) Patent No.: US 11,247,525 B2
(45) Date of Patent: Feb. 15, 2022

(54) TRAILING ARM MOUNTING BRACKET FOR VEHICLE

(71) Applicants: Hyundai Motor Company, Seoul (KR); Kia Motors Corporation, Seoul (KR)

(72) Inventors: Hyung Jin Kim, Gyeonggi-do (KR); Chong Ku Kang, Seoul (KR); Seung Hyun Kang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 135 days.

(21) Appl. No.: 16/451,350

(22) Filed: Jun. 25, 2019

(65) Prior Publication Data
US 2020/0215868 A1   Jul. 9, 2020

(30) Foreign Application Priority Data
Jan. 9, 2019   (KR) .......................... 10-2019-0002950

(51) Int. Cl.
*B60G 21/05*   (2006.01)
*B60G 7/02*   (2006.01)
*B60G 7/00*   (2006.01)

(52) U.S. Cl.
CPC ........... *B60G 21/052* (2013.01); *B60G 7/001* (2013.01); *B60G 7/02* (2013.01)

(58) Field of Classification Search
CPC ........ B60G 21/052; B60G 7/02; B60G 7/001; B60G 2204/1434; B60G 2204/43; B60G 2204/41
See application file for complete search history.

(56) References Cited

U.S. PATENT DOCUMENTS 6,267,397 B1 *  7/2001  Hamada ................... B60G 9/02
                                                 280/124.128
2004/0183271 A1   9/2004  Galazin et al.
(Continued)

FOREIGN PATENT DOCUMENTS

CN       203580539 U    5/2014
CN       203611670 U    5/2014
(Continued)

OTHER PUBLICATIONS

Machine Translation of JP2017178244 (Year: 2017).*
Machine Translation of FR2838376 (Year: 2002).*
Machine Translation of JP2007131271 (Year: 2007).*

*Primary Examiner* — Paul N Dickson
*Assistant Examiner* — Kurtis Nielson
(74) *Attorney, Agent, or Firm* — Mintz Levin Cohn Ferris Glovsky and Popeo, P.C.; Peter F. Corless

(57) ABSTRACT

A trailing arm mounting bracket for connecting a trailing arm to a vehicle body includes: a fixing portion fixed to the vehicle body, a first connection plate and a second connection plate each extending from opposite ends of the fixing portion to support opposite ends of a mounting bush of the trailing arm and to which a fastening bolt fastened to the mounting bush is coupled, a first reinforcement portion to connect and reinforce the portions where the first and second connection plates and the fixing portion are connected with a truss structure, and a second reinforcement portion to connect and reinforce the first connection plate and the second connection plate at a position in the front of the mounting bush.

6 Claims, 4 Drawing Sheets

(56) References Cited

U.S. PATENT DOCUMENTS

| | | | |
|---|---|---|---|
| 2007/0145657 A1* | 6/2007 | Funano | B60G 21/052 |
| | | | 267/293 |
| 2007/0176385 A1* | 8/2007 | Barton | B60G 9/00 |
| | | | 280/124.116 |
| 2010/0065998 A1* | 3/2010 | Tomida | B60G 7/02 |
| | | | 267/293 |
| 2018/0244119 A1* | 8/2018 | Haglauer | B60G 5/04 |
| 2020/0062060 A1* | 2/2020 | Chevalier | B62D 29/008 |
| 2021/0122422 A1* | 4/2021 | Kimura | B62D 25/08 |

FOREIGN PATENT DOCUMENTS

| | | | | |
|---|---|---|---|---|
| CN | 204432283 U | | 7/2015 | |
| DE | 102010039245 A1 | * | 2/2012 | B60G 21/051 |
| DE | 102014212950 B4 | * | 10/2017 | B62D 25/025 |
| EP | 1721762 A1 | * | 11/2006 | B62D 25/08 |
| FR | 2812242 A1 | * | 2/2002 | B60G 11/225 |
| FR | 2838376 A1 | * | 10/2003 | B60G 21/052 |
| FR | 2936035 A1 | * | 3/2010 | B60G 21/052 |
| JP | 2007131271 A | * | 5/2007 | |
| JP | 4003643 B2 | | 11/2007 | |
| JP | 2011152915 A | * | 8/2011 | B60G 7/006 |
| JP | 2017043176 A | | 3/2017 | |
| JP | 2017178244 A | | 10/2017 | |
| JP | 2017178244 A | * | 10/2017 | |
| KR | 10-2015-0062287 A | | 6/2015 | |
| KR | 10-2015-0062763 A | | 6/2015 | |
| WO | WO-2007116179 A1 | * | 10/2007 | B60G 7/02 |
| WO | WO-2015029550 A1 | * | 3/2015 | B60G 21/052 |

\* cited by examiner

TRAILING ARM MOUNTING BRACKET FOR VEHICLE

CROSS-REFERENCE TO RELATED APPLICATION(S)

This application claims under 35 U.S.C. § 119 the benefit of Korean Patent Application No. 10-2019-0002950, filed on Jan. 9, 2019 in the Korean Intellectual Property Office, the entire contents of which are incorporated by reference herein.

BACKGROUND

1. Technical Field

The present disclosure relates to a trailing arm mounting bracket for connecting a trailing arm of a vehicle to a vehicle body.

2. Description of the Related Art

A coupled torsion beam axle (CTBA) type suspension includes a torsion beam extending in a width direction of a vehicle and trailing arms connected to opposite ends of the torsion beam.

A front end portion of the trailing arm is rotatably connected to a vehicle body by a mounting bracket through a mounting bush, and a rear end portion of the trailing arm is bufferably supported on the vehicle body by a shock absorber and a spring. The trailing arm includes a carrier for mounting a wheel.

The trailing arm is not only connected to the torsion beam at one side and to the wheel at the other side, but also connected to the vehicle body via the mounting bracket, the shock absorber and the spring. Accordingly, the trailing arm is subjected to a large lateral load, a large longitudinal load, and a large vertical load when the vehicle is running. Likewise, the mounting bracket connecting the trailing arm to the vehicle body is also subjected to a large lateral load and a longitudinal load. Therefore, it is necessary to secure sufficient rigidity of the mounting bracket connecting the vehicle body and the trailing arm for stable operation of the suspension.

In a conventional vehicle, however, it is difficult to ensure sufficient rigidity of connection portions because the mounting bracket connecting the trailing arm is fixed only by welding to a side sill and a rear side member of the vehicle body. Further, in a conventional mounting bracket, if the thickness of a metal panel is increased to ensure the rigidity of the connection portions, its weight increases, and if its size is increased, it becomes difficult to secure sufficient installation space.

SUMMARY

It is an aspect of the disclosure to provide a trailing arm mounting bracket capable of remarkably enhancing the rigidity of portions connected to a vehicle body while reducing the size and weight thereof and capable of dispersing and transmitting a lateral load and a longitudinal load from trailing arm to the vehicle body.

In accordance with an aspect of the disclosure, trailing arm mounting bracket for connecting a trailing arm to a vehicle body, including: a fixing portion fixed to the vehicle body, a first connection plate and a second connection plate each extending from opposite ends of the fixing portion to support opposite ends of a mounting bush of the trailing arm and to which a fastening bolt fastened to the mounting bush is coupled, a first reinforcement portion to connect and reinforce the portions where the first and second connection plates and the fixing portion are connected with a truss structure, and a second reinforcement portion to connect and reinforce the first connection plate and the second connection plate at a position in the front of the mounting bush.

The fixing portion may be welded to a rear side member of the vehicle body, and one of the first connection plate and the second connection plate may be welded to a side sill of the vehicle body.

The first connection plate and the second connection plate may be formed in a semicircular shape and each have a through hole through which the fastening bolt passes.

The first reinforcement portion may include a plurality of truss members to slantingly connect a point of the fixing portion, which is laterally spaced apart from a point where the first or second connection plate meets the fixing portion, and a side surface of the first or second connection plate.

The plurality of truss members may include a first truss member to slantingly connect a second point of the fixing portion, which is laterally spaced apart from a first point where the first connection plate and the fixing portion meet, and the side surface of the first connection plate, a second truss member to slantingly connect a third point of the fixing portion, which is spaced apart from the first point to the opposite side of the second point, and the side surface of the first connection plate, and a third truss member to slantingly connect a fifth point of the fixing portion, which is laterally spaced apart from a fourth point where the second connection plate and the fixing portion meet, and the side surface of the second connection plate.

The first reinforcement portion may include a first partition space formed between the first truss member and the first point, a second partition space formed between the second truss member and the first point, and a third partition space formed between the third truss member and the fourth point.

The second reinforcement portion may include a first reinforcement plate extending in a lateral direction and having opposite ends connected to the first connection plate and the second connection plate, a second reinforcement plate extending forward from a central portion of the first reinforcement plate, a third reinforcement plate slantingly connecting a front end of the second reinforcement plate and a side surface of the first connection plate, and a fourth reinforcement plate slantingly connecting the front end of the second reinforcement plate and a side surface of the second connection plate.

The second reinforcement portion may further include partition spaces formed on both sides of the second reinforcement plate.

The first reinforcement plate, the second reinforcement plate, the third reinforcement plate and the fourth reinforcement plate may be integrally connected to the fixing portion.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
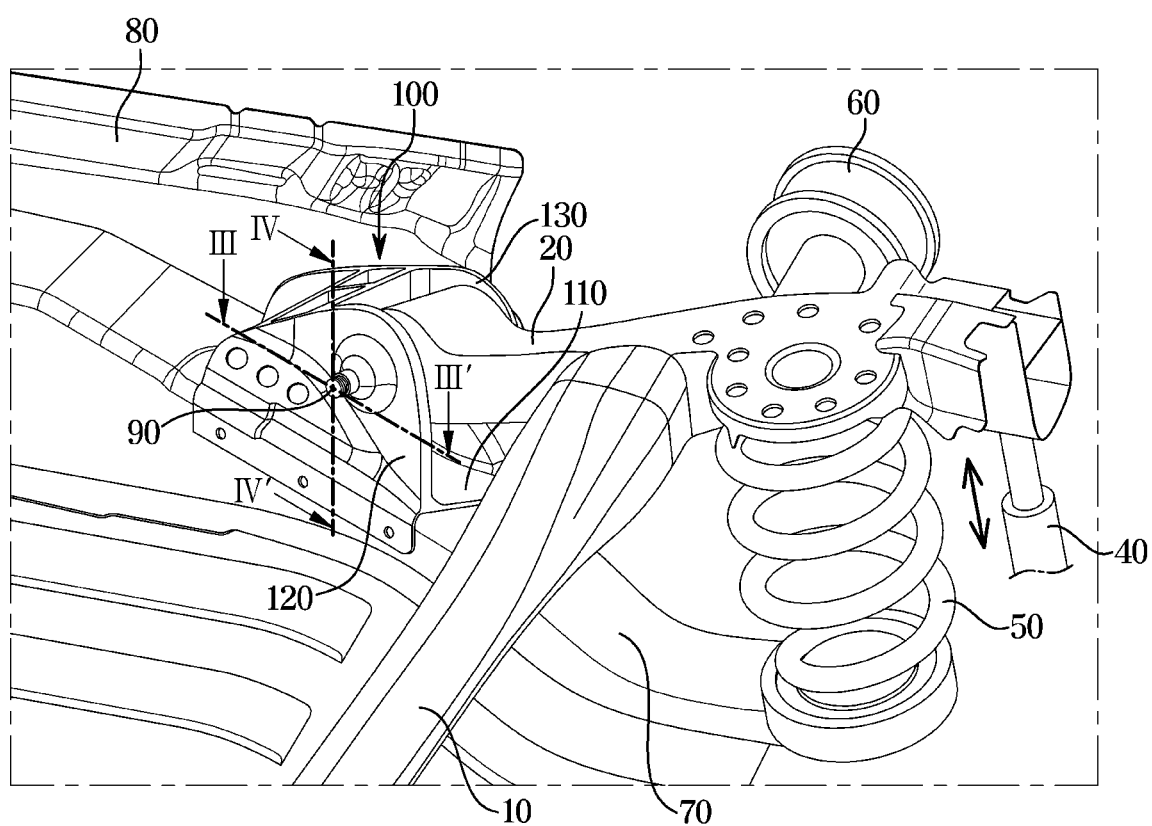
FIG. 1 is a perspective view showing a state in which a trailing arm of a suspension is mounted on a vehicle body by a trailing arm mounting bracket according to an embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 2:
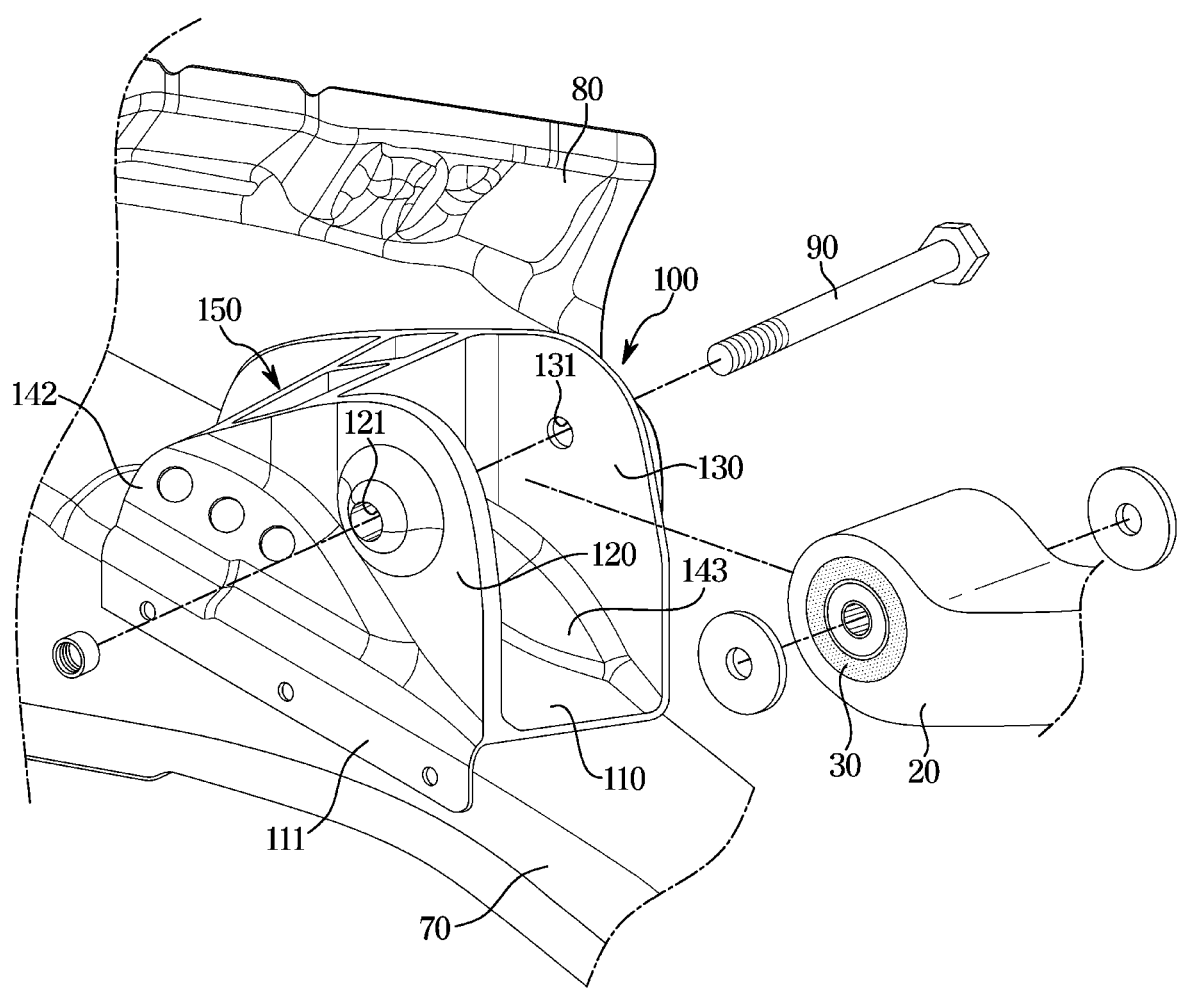
FIG. 2 is a partially exploded perspective view showing that the trailing arm is mounted on the trailing arm mounting bracket according to an embodiment of the disclosure.

FIG. 1 is a perspective view showing a state in which a trailing arm of a suspension is mounted on a vehicle body by trailing arm mounting bracket according to an embodiment of the disclosure, viewed from a lower side of a vehicle. FIG. 2 is a partially exploded perspective view showing that the trailing arm is mounted on the trailing arm mounting bracket according to an embodiment of the disclosure.

Referring to FIGS. 1 and 2, a coupled torsion beam axle (CTBA) type suspension includes a torsion beam 10 extending in a width direction of a vehicle and trailing arms 20 connected to opposite ends of the torsion beam 10.

A front end portion of the trailing arm 20 may be rotatably connected to a vehicle body by a mounting bracket 100 through a mounting bush coupled to the front end portion, and a rear end portion of the trailing arm 20 may be bufferably supported on the vehicle body by a shock absorber 40 and a spring 50. The trailing arm 20 includes a carrier 60 for mounting a wheel.

Figure 3:
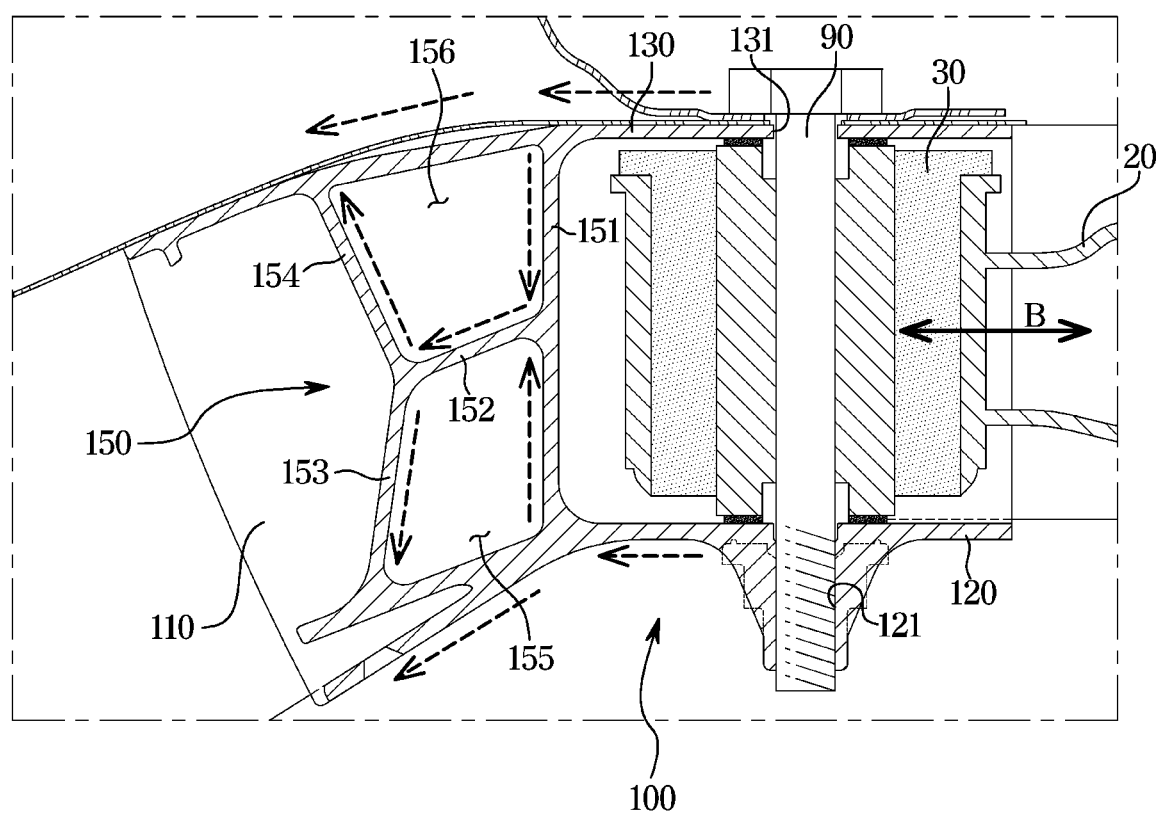
FIG. 3 is a cross-sectional view taken along line III-III' in FIG. 1.
Figure 4:
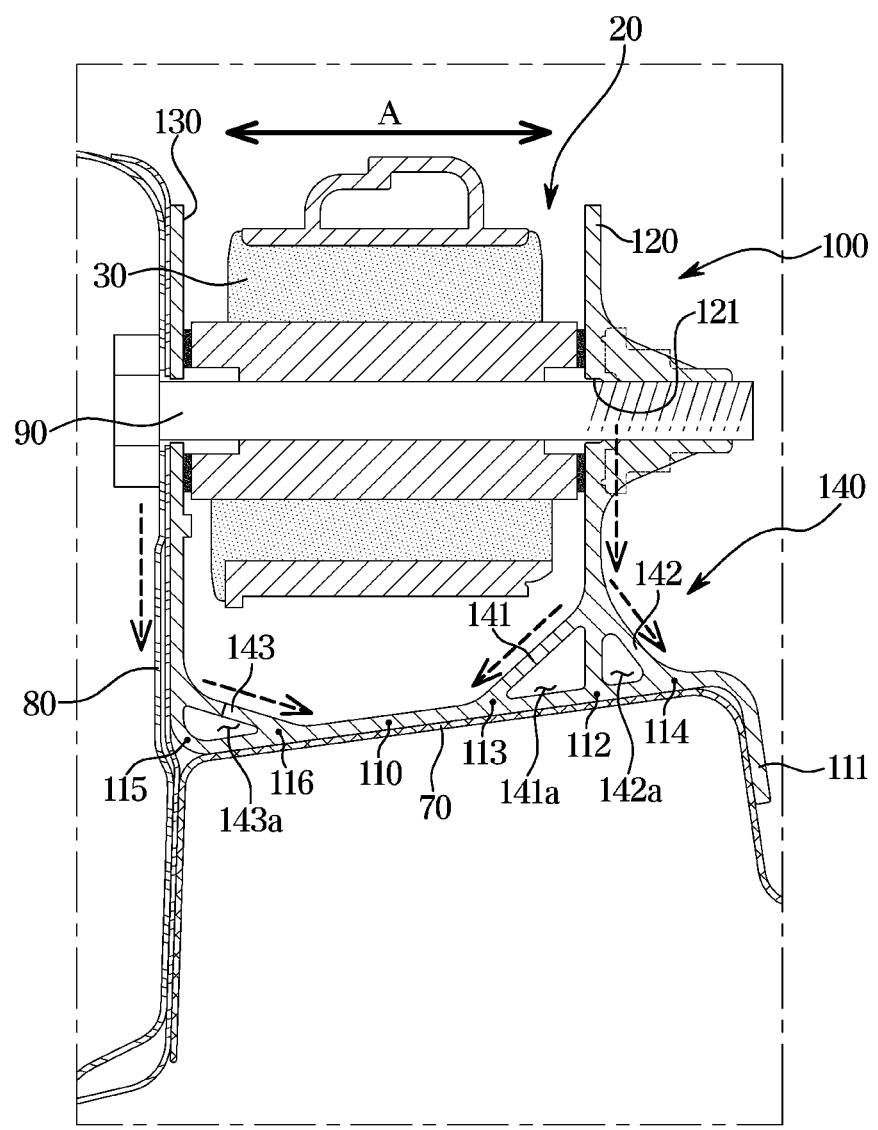
FIG. 4 is a cross-sectional view taken along line IV-IV' in FIG. 1.

Referring to FIGS. 2 to 4, the mounting bracket 100 may be fixed to a rear side member 70 and a side sill 80 of a lower portion of the vehicle body so that the mounting bracket 100 may rotatably connect the front end portion of the trailing arm 20 to the vehicle body. The mounting bracket 100 includes a fixing portion 110, a first connection plate 120, a second connection plate 130, a first reinforcement portion 140, and a second reinforcement portion 150.

The fixing portion 110 may be substantially provided in the form of a flat plate and fixed to a lower surface of the rear side member 70 of the vehicle body by welding. As illustrated in FIGS. 2 and 4, the fixing portion 110 includes a side extension portion 111 welded to a side surface of the rear side member 70 in a state of being bent and extended toward the side surface of the rear side member 110 for solid coupling.

The first connection plate 120 and the second connection plate 130 extend from opposite ends of the fixing portion 110 in a state of being separated from each other to support opposite ends of a mounting bush 30 provided at the front end portion of the trailing arm 20, respectively. The first connection plate 120 and the second connection plate 130 are provided in a semicircular shape in which the width in a front-rear direction (a longitudinal direction) is gradually reduced toward the side connected to the trailing arm 20 from the side connected to the fixing portion 110. The first connection plate 120 and the second connection plate 130 are provided with through holes 121 and 131 through which a fastening bolt 90 for fastening the mounting bush 30 of the trailing arm 20 passes in a lateral direction at positions spaced apart from the fixing portions 110, respectively.

The trailing arm 20 may be rotatably connected to the mounting bracket 100 by the fastening bolt 90 passing through the first and second connection plates 120 and 130 and the mounting bush 30 in a state in which the mounting bush 30 enters between the first connection plate 120 and the second connection plate 130.

Because the first connection plate 120 and the second connection plate 130, which support the trailing arm 20, are each provided in a semicircular shape to form an arcuate supporting structure, the first connection plate 120 and the second connection plate 130 may disperse and transmit the load transmitted from the trailing arm 20 to the fixing unit 110. Accordingly, the first connection plate 120 and the second connection plate 130 may stably support the trailing arm 20 while reducing the thickness and size thereof.

The mounting bracket 100 may be welded to the side sill 80 in a state in which the second connection plate 130 is in close contact with a side surface of the side sill 80 of the vehicle body as in the example shown in FIG. 4. As such, because the fixing portion 110 is welded to the rear side member 70 and the second connection plate 130 is welded to the side surface of the side sill 80, the mounting bracket 100, which is firmly fixed, may support the trailing arm 20.

As illustrated in FIG. 4, the first reinforcement portion 140 connects and reinforces the portions where the first and second connection plates 120 and 130 and the fixing portion 110 are connected with a truss structure. The first reinforcement portion 140 may include first to third truss members 141, 142 and 143 to slantingly connect points of the fixing portion 110, which are laterally spaced apart from a point where the first or second connection plate 120 or 130 meets the fixing portion 110, and a side surface of the first or second connection plate 120 or 130.

Specifically, the first reinforcement portion 140 includes the first truss member 141 to slantingly connect a second point 113 of the fixing portion 110, which is laterally spaced apart from a first point 112 where the first connection plate 120 and the fixing portion 110 meet, and the side surface of the first connection plate 120, the second truss member 142 to slantingly connect a third point 114 of the fixing portion 110, which is spaced apart from the first point 112 to the opposite side of the second point 113, and the side surface of the first connection plate 120, and the third truss member 143 to slantingly connect a fifth point 116 of the fixing portion 110, which is laterally spaced apart from a fourth point 115 where the second connection plate 130 and the fixing portion 110 meet, and the side surface of the second connection plate 130. The first to third truss members 141, 142, and 143 may be provided in a flat plate shape and extend in the front-rear direction of the vehicle body to increase the rigidity of the portion where the first or second connection plates 120 or 130 and the fixing portion 110 meet.

Because the first reinforcement portion 140 includes a first partition space 141a formed between the first truss member 141 and the first point 112, a second partition space 142a formed between the second truss member 142 and the first point 112, and a third partition space 143a formed between the third truss member 143 and the fourth point 115, the rigidity of the portion connecting the first connection plate 120 or the second connection plate 130 to the fixing plate 110 may be reinforced, and the mounting bracket 100 may be lightened.

As illustrated in FIG. 4, the first reinforcement portion 140 may allow a lateral load A transmitted from the trailing arm 20 to the first connection plate 120 and the second connection plate 130 to be dispersed and transmitted to the fixing portion 110 because the first truss member 141 and the second truss member 142 reinforce the connecting portion between the first connection plate 120 and the fixing portion 110 with a truss structure and the third truss member 143 reinforces the connecting portion between the second connection plate 130 and the fixing portion 110 with a truss structure. Accordingly, the first reinforcement portion 140 may prevent the connecting portion between the first connection plate 120 and the fixing portion 110 or the connecting portion between the second connection plate 130 and the fixing portion 110 from being damaged by a local action of the lateral load A.

As illustrated in FIG. 3, the second reinforcement portion 150 connects and reinforces the first connection plate 120 and the second connection plate 130 at a position in the front of the mounting bush 30 of the trailing arm 20.

The second reinforcement portion 150 may include a first reinforcement plate 151 extending in a lateral direction and having opposite ends connected to the first connection plate 120 and the second connection plate 130, a second reinforcement plate 152 extending forward from a substantially central portion of the first reinforcement plate 151, a third reinforcement plate 153 slantingly connecting a front end of the second reinforcement plate 152 and the side surface of the first connection plate 120, a fourth reinforcement plate 154 slantingly connecting the front end of the second reinforcement plate 152 and a side surface of the second connection plate 130, and partition spaces 155 and 156 formed on both sides of the second reinforcement plate 152. The first reinforcement plate 151, the second reinforcement plate 152, the third reinforcement plate 153 and the fourth reinforcement plate 154 may be integrally connected to the fixing portion 110 at one side thereof in order to reinforce the rigidity of the front portions of the first connection plate 120 and the second connection plate 130.

The second reinforcement portion 150 may not only significantly enhance the rigidity of the front half of the mounting bracket 100 by connecting the first connection plate 120 and the second connection plate 130 at a position in the front of the mounting bush 30, but may also disperse and transmit a longitudinal load B, which is transmitted from the trailing arm 20 to the first connection plate 120 and the second connection plate 130, to the fixing portion 110 through the first to fourth reinforcement plates 151 to 154. Therefore, even when the longitudinal load B is repeatedly applied to the first connection plate 120 and the second connection plate 130, the connecting portion between the first connection plate 120 and the fixing portion 110 or the connecting portion between the second connection plate 130 and the fixing portion 110 may be prevented from being broken.

As such, because the mounting bracket 100 according to an embodiment of the disclosure includes the first reinforcement portion 140 and the second reinforcement portion 150, the rigidity of the connection portions between the first and second connection plates 120 and 130 and the fixing portion 110 may be not only significantly enhanced, but the lateral load A and the longitudinal load B transmitted from the trailing arm 20 to the first and second connection plates 120 and 130 may also be dispersed and transmitted to the fixing portion 110 fixed to the vehicle body. Therefore, the rigidity of the mounting bracket 100 may be significantly enhanced while reducing the size and weight thereof.

Although the mounting bracket 100 is complicated in shape due to the first and second reinforcement portions 140 and 150, the mounting bracket 100 may be easily manufactured using a metal 3D printing technique. As the metal 3D printing technique, a sintering method in which a metal is melted and hardened by using a high energy heat source such as a laser or an electron beam, or a method of 3D printing a metal based on the electroplating method may be applied.

As is apparent from the above, because a trailing arm mounting bracket according to an embodiment of the disclosure includes a first reinforcement portion and a second reinforcement portion, the rigidity of the connection portions between first and second connection plates and a fixing portion may be not only significantly enhanced, but a lateral load and a longitudinal load transmitted from a trailing arm to the first and second connection plates may also be dispersed and transmitted to the fixing portion fixed to a vehicle body. Therefore, the rigidity of the mounting bracket may be significantly enhanced while reducing the size and weight thereof.

What is claimed is:

1. A trailing arm mounting bracket for connecting a trailing arm to a vehicle body, comprising:
a fixing portion fixed to the vehicle body;
a first connection plate and a second connection plate each extending from opposite ends of the fixing portion to support opposite ends of a mounting bush of the trailing arm and to which a fastening bolt fastened to the mounting bush is coupled;
a first reinforcement portion to connect and reinforce portions where the first and second connection plates and the fixing portion are connected with a truss structure; and
a second reinforcement portion to connect and reinforce the first connection plate and the second connection plate at a position in the front of the mounting bush,
wherein the first reinforcement portion includes a plurality of truss members to slantingly connect a point of the fixing portion, which is laterally spaced apart from a point where the first or second connection plate meets the fixing portion, and a side surface of the first or second connection plate,
wherein the plurality of truss members include:
a first truss member to slantingly connect a second point of the fixing portion, which is laterally spaced apart from a first point where the first connection plate and the fixing portion meet, and the side surface of the first connection plate;
a second truss member to slantingly connect a third point of the fixing portion, which is spaced apart from the first point to the opposite side of the second point, and the side surface of the first connection plate; and
a third truss member to slantingly connect a fifth point of the fixing portion, which is laterally spaced apart from a fourth point where the second connection plate and the fixing portion meet, and the side surface of the second connection plate, and
wherein:
the fixing portion is welded to a rear side member of the vehicle body, and
one of the first connection plate and the second connection plate is welded to a side sill of the vehicle body.

2. The trailing arm mounting bracket according to claim 1, wherein the first connection plate and the second connection plate are formed in a semicircular shape and each have a through hole through which the fastening bolt passes.

3. The trailing arm mounting bracket according to claim 1, wherein the first reinforcement portion includes:
a first partition space formed between the first truss member and the first point;
a second partition space formed between the second truss member and the first point; and
a third partition space formed between the third truss member and the fourth point.

4. A trailing arm mounting bracket for connecting a trailing arm to a vehicle body, comprising:
a fixing portion fixed to the vehicle body;
a first connection plate and a second connection plate each extending from opposite ends of the fixing portion to support opposite ends of a mounting bush of the trailing arm and to which a fastening bolt fastened to the mounting bush is coupled;
a first reinforcement portion to connect and reinforce portions where the first and second connection plates and the fixing portion are connected with a truss structure; and
a second reinforcement portion to connect and reinforce the first connection plate and the second connection plate at a position in the front of the mounting bush,
wherein the second reinforcement portion includes:
a first reinforcement plate extending in a lateral direction and having opposite ends connected to the first connection plate and the second connection plate;
a second reinforcement plate extending forward from a central portion of the first reinforcement plate;
a third reinforcement plate slantingly connecting a front end of the second reinforcement plate and a side surface of the first connection plate; and
a fourth reinforcement plate slantingly connecting the front end of the second reinforcement plate and a side surface of the second connection plate.

5. The trailing arm mounting bracket according to claim 4, wherein the second reinforcement portion further includes partition spaces formed on both sides of the second reinforcement plate.

6. The trailing arm mounting bracket according to claim 4, wherein the first reinforcement plate, the second reinforcement plate, the third reinforcement plate and the fourth reinforcement plate are integrally connected to the fixing portion.

* * * * *